US012734505B2

(12) United States Patent
Lee et al.

(10) Patent No.: US 12,734,505 B2
(45) Date of Patent: Sep. 15, 2026

(54) CATALYST STRUCTURE HAVING A CORE-SHELL STRUCTURE WITH A CONTROLLED SURFACE MORPHOLOGY AND PREPARATION METHOD THEREOF

(71) Applicant: UNIVERSITY OF SEOUL INDUSTRY COOPERATION FOUNDATION, Seoul (KR)

(72) Inventors: Doohwan Lee, Seoul (KR); Dohyeon Han, Seoul (KR); Jieun Kim, Seoul (KR)

(73) Assignee: UNIVERSITY OF SEOUL INDUSTRY COOPERATION FOUNDATION, Seoul (KR)

( * ) Notice: Subject to any disclaimer, the term of this patent is extended or adjusted under 35 U.S.C. 154(b) by 723 days.

(21) Appl. No.: 18/101,215

(22) Filed: Jan. 25, 2023

(65) Prior Publication Data

US 2023/0234031 A1 Jul. 27, 2023

(30) Foreign Application Priority Data

Jan. 26, 2022 (KR) ........................ 10-2022-0011644

(51) Int. Cl.

| | |
|---|---|
| ***B01J 21/04*** | (2006.01) |
| ***B01J 35/30*** | (2024.01) |
| ***B01J 35/50*** | (2024.01) |
| ***B01J 35/55*** | (2024.01) |
| ***B01J 35/70*** | (2024.01) |
| ***B01J 37/02*** | (2006.01) |
| ***B01J 37/03*** | (2006.01) |

(Continued)

(52) U.S. Cl.

CPC ............ *B01J 21/04* (2013.01); *B01J 35/398* (2024.01); *B01J 35/505* (2024.01);

(Continued)

(58) Field of Classification Search

CPC ........ B01J 21/04; B01J 35/398; B01J 35/505; B01J 37/035; B01J 37/0236; B01J 37/08; B01J 35/55; B01J 2235/30; B01J 2235/15

(Continued)

(56) References Cited

U.S. PATENT DOCUMENTS

2010/0266897 A1* 10/2010 Lee ...................... H01M 4/131 427/532
2012/0041246 A1* 2/2012 Scher .................. B01J 37/0018 502/305

FOREIGN PATENT DOCUMENTS

CN 108067250 A * 5/2018 ................ C02F 1/30
JP 2003-238150 8/2003

(Continued)

OTHER PUBLICATIONS

Zhu, Y., Cao, C., Tao, S. et al. Ultrathin Nickel Hydroxide and Oxide Nanosheets: Synthesis, Characterizations and Excellent Supercapacitor Performances. Sci Rep 4, 5787 (2014). https://doi.org/10.1038/srep05787. (Year: 2014).*

(Continued)

*Primary Examiner* — Anthony J Zimmer
*Assistant Examiner* — Annette Phan
(74) *Attorney, Agent, or Firm* — LEX IP MEISTER, PLLC

(57) ABSTRACT

The present invention provides a catalyst structure having a core-shell structure comprising a core comprising a metal and a shell formed on the core, wherein the shell comprises a metal hydroxide crystal or a metal oxide crystal formed uniformly in shape and size perpendicular to the surface of the metal, wherein the metal hydroxide crystal or the metal oxide crystal have a 2D structure or a 1D structure, and preparation method thereof.

4 Claims, 7 Drawing Sheets

(51) Int. Cl.
*B01J 37/04* (2006.01)
*B01J 37/08* (2006.01)

(52) U.S. Cl.
CPC ......... *B01J 37/0236* (2013.01); *B01J 37/035* (2013.01); *B01J 37/04* (2013.01); *B01J 37/08* (2013.01); *B01J 35/50* (2024.01); *B01J 35/55* (2024.01); *B01J 35/70* (2024.01); *B01J 2235/15* (2024.01); *B01J 2235/30* (2024.01)

(58) Field of Classification Search
USPC .......................................................... 502/355
See application file for complete search history.

(56) References Cited

FOREIGN PATENT DOCUMENTS

| | | | |
|---|---|---|---|
| JP | 2012-071996 | 4/2012 | |
| JP | 2012-121773 | 6/2012 | |
| KR | 10-2013-0012664 | 2/2013 | |
| KR | 10-1834486 | 3/2018 | |
| KR | 10-2129821 | 7/2020 | |
| KR | 10-2308828 | 10/2021 | |
| WO | WO-2019020086 A1 * | 1/2019 | ............. B82Y 30/00 |

OTHER PUBLICATIONS

Dohyeon Han et al., "Morphology Controlled Synthesis of γ-Al2O3 Nano-Crystallites in Al@Al2O3 Core-Shell Micro-Architectures by Interfacial Hydrothermal Reactions of Al Metal Substrates," Nanomaterials, vol. 11, p. 310, Jan. 2021, doi: 10.3390/nano11020310.

Jieun Kim et al., "Synthesis and Properties of Al2O3@Al Metal-Ceramic Core-Shell Microstructures for Catalyst Applications", Top Catal (2015) 58:375-385, Feb. 27, 2015.

* cited by examiner

【FIG. 1】
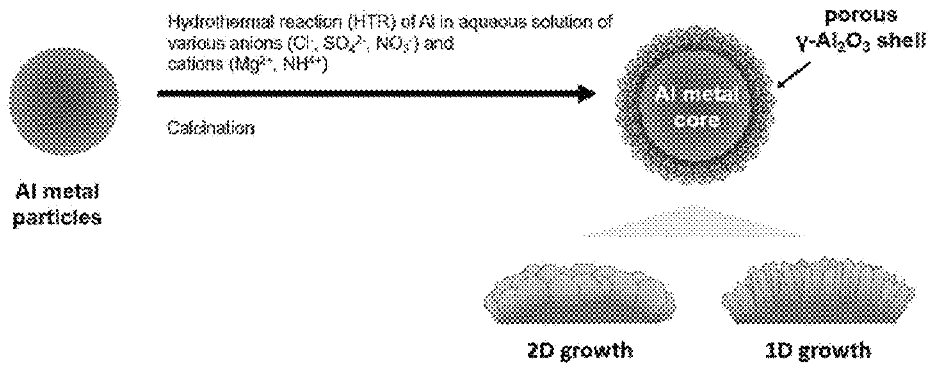
【FIG. 2】
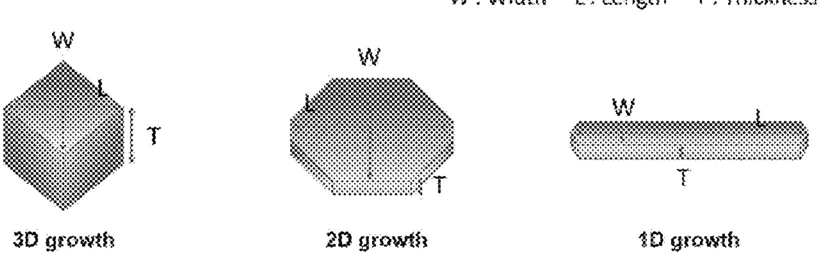

【FIG. 3】
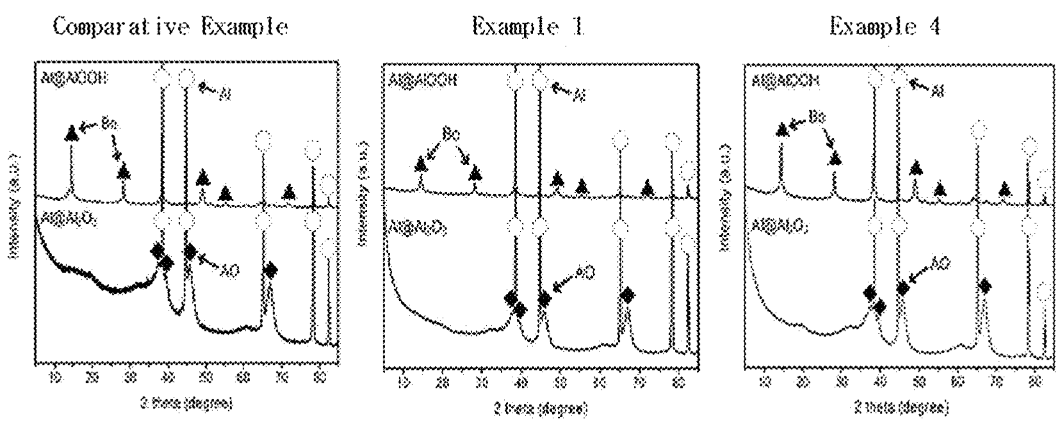
Bo : The diffraction peaks of the γ-AlOOH
Al : The diffraction peaks of the Al
AO : The diffraction peaks of the γ-$Al_2O_3$
【FIG. 4】
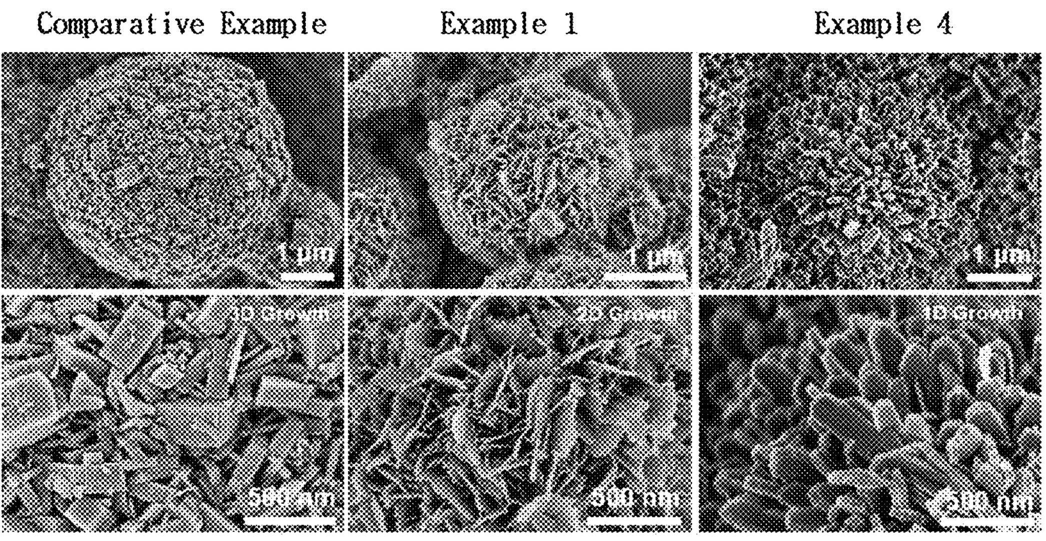

【FIG. 5】
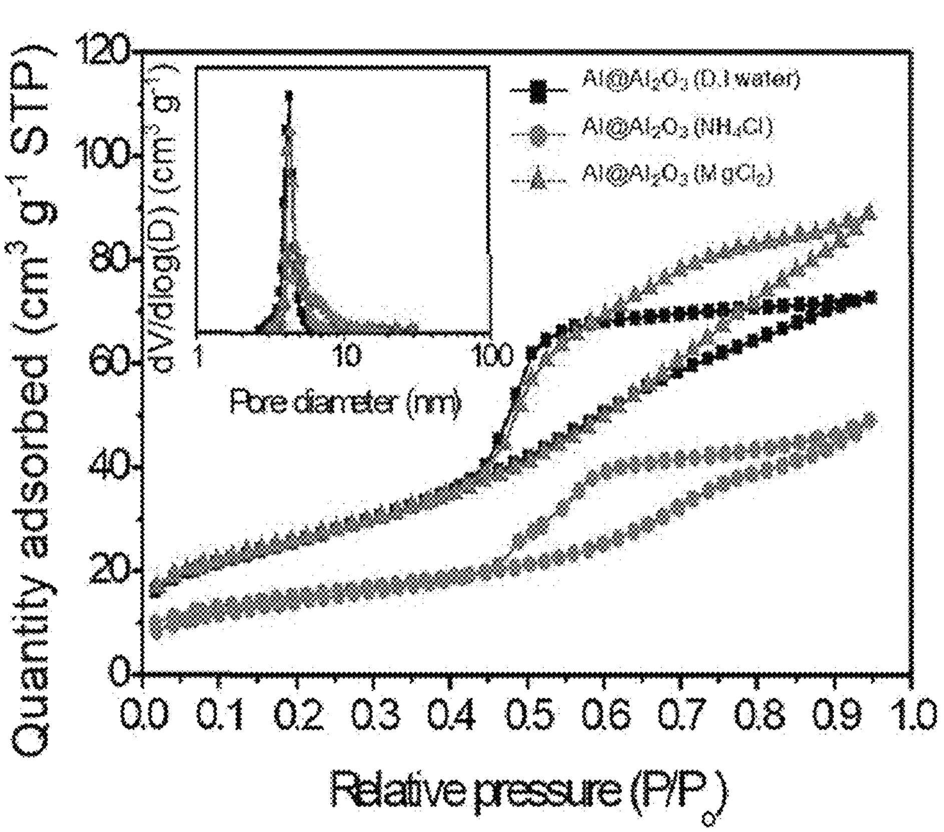

【FIG. 6】
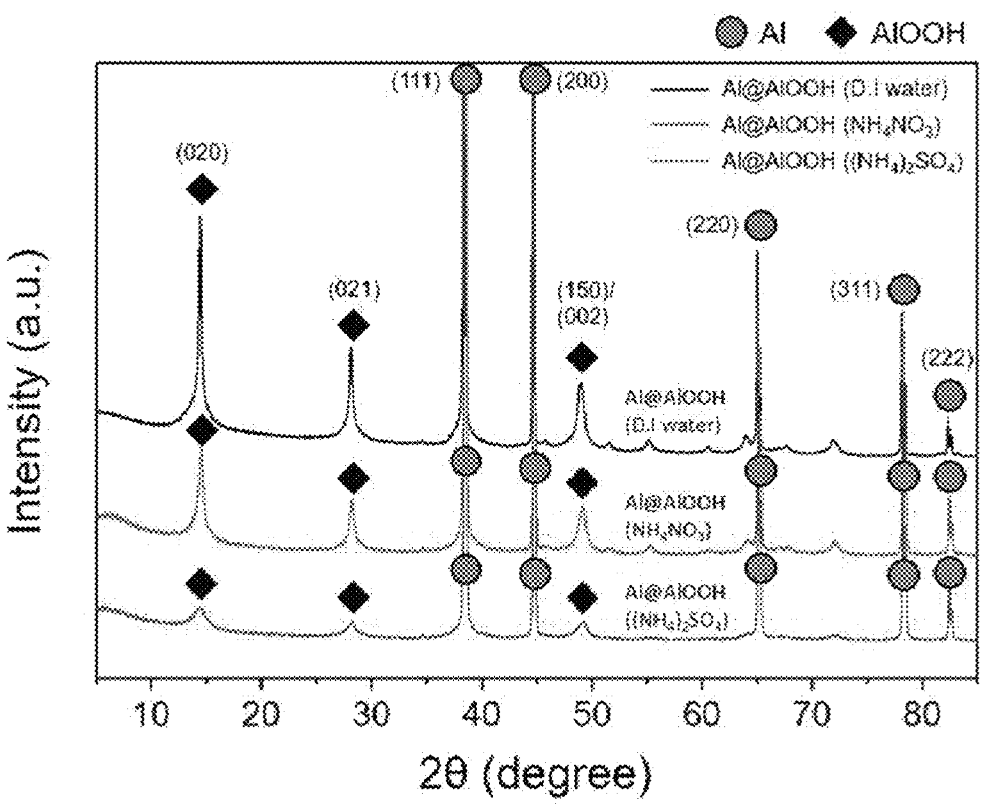

【FIG. 7】
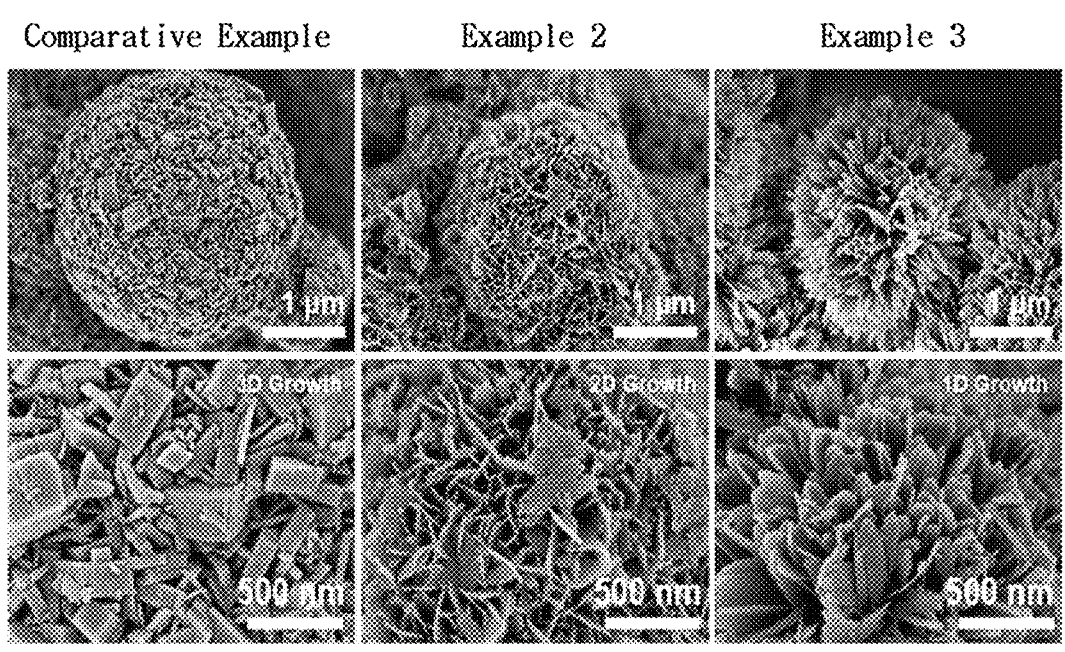

【FIG. 8】
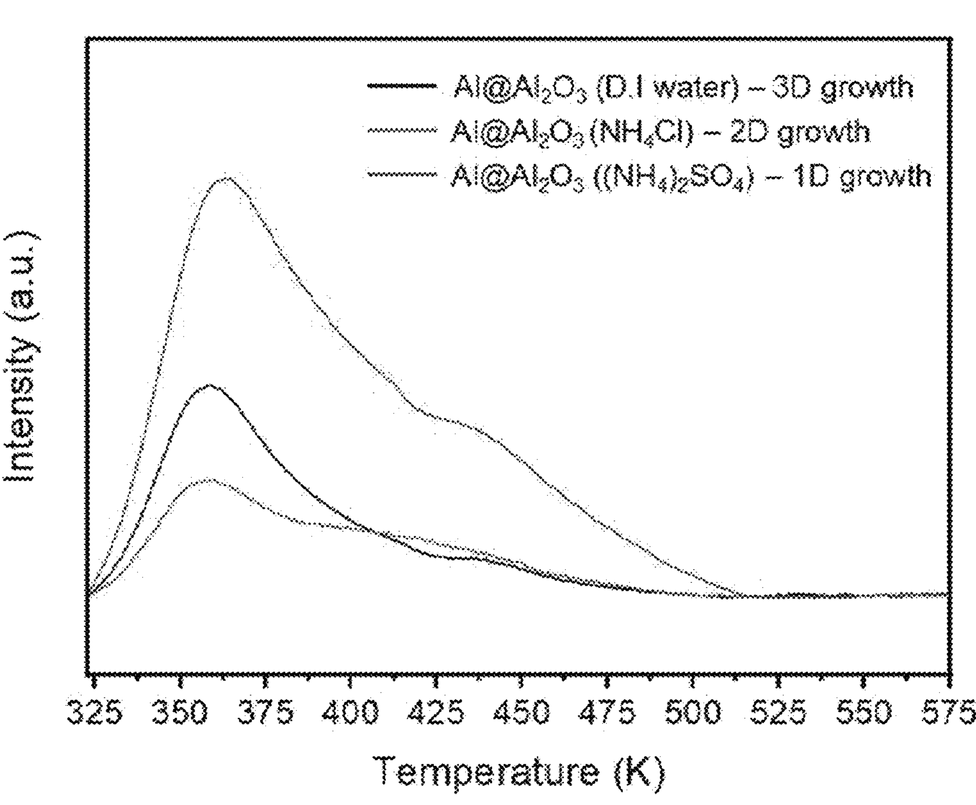

【FIG. 9】
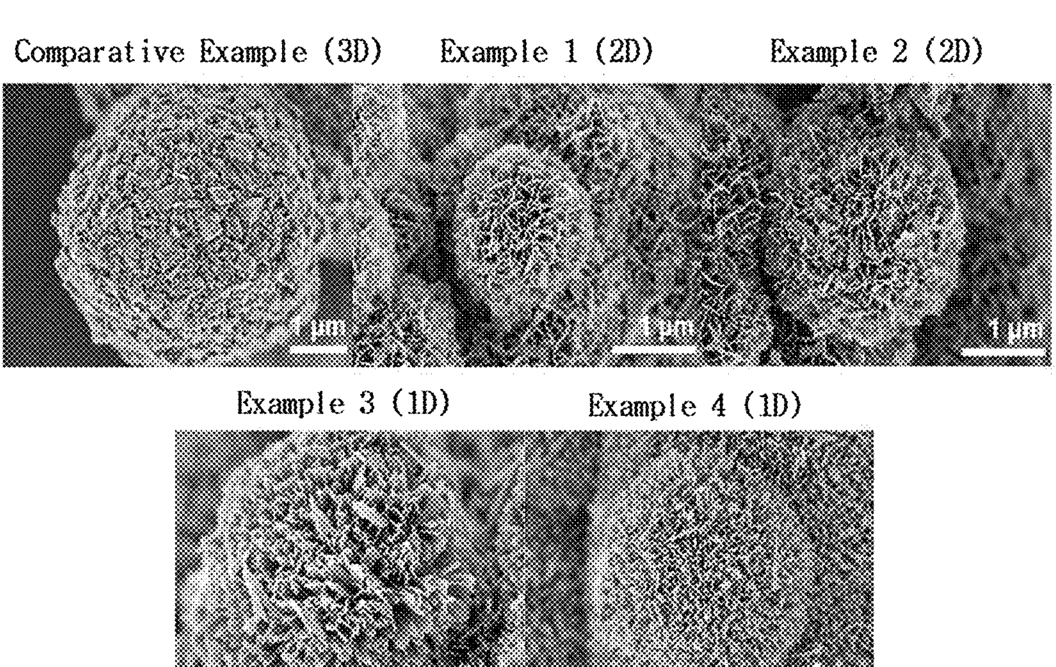

CATALYST STRUCTURE HAVING A CORE-SHELL STRUCTURE WITH A CONTROLLED SURFACE MORPHOLOGY AND PREPARATION METHOD THEREOF

CROSS-REFERENCE TO RELATED APPLICATION

This application claims priority to and the benefit of Korean Patent Application No. 10-2022-0011644 filed in the Korean Intellectual Property Office on Jan. 26, 2022, and article of "*Morphology Controlled Synthesis of γ-Al2O3 Nano-Crystallites in Al@Al2O3 Core—Shell Micro-Architectures by Interfacial Hydrothermal Reactions of Al Metal Substrates, Nanomaterials* 2021, 11, 310. https://doi.org/10.3390/nano11020310" on Jan. 26, 2021, the entire contents of which are incorporated herein by reference.

BACKGROUND OF THE INVENTION

(a) Field of the Invention

The present invention relates to a catalyst structure having a core-shell structure with a controlled surface morphology and preparation method thereof, and more particularly, to a catalyst structure capable of controlling the surface morphology by changing the type of ion comprising a heteroatom added during the manufacturing process and a manufacturing method thereof.

(b) Description of the Related Art

A catalyst refers to a third substance that promotes or inhibits a chemical reaction without itself changing, and can be divided into inorganic catalysts and organic catalysts.

Inorganic catalysts are often used in a form immobilized on the surface of a carrier having a high surface area of an inorganic metal having catalytic activity, and in this case, the catalyst carrier greatly affects catalytic activity and selectivity. This is because the catalyst activity and selectivity differ due to the structural characteristics of the catalyst carrier (pore structure, surface area, pore size, pore volume, etc.) and the unique interaction between the active metal and the catalyst carrier.

The heat and mass transfer properties of the catalyst carrier are also important properties that greatly affect the reaction activity of the catalyst. In the heterogeneous reaction caused by the supported catalyst, since the catalyst is fixed form on the surface of the carrier having a porous structure, a mass transfer process in which reactants move toward the catalyst becomes very important. According to the contents of Reactor Analysis and Design and Elements of Chemical Reaction Engineering (author H. S. Fogler), it is known that 7 reaction steps are required in heterogeneous catalyst reaction, which are i) transfer of reactants in the bulk mixture to catalyst particles, ii) transfer of reactants to active surfaces in the pores of catalyst particles, iii) adsorption of reactants to active surfaces, iv) production of products due to reaction of reactants, v) desorption of products from active surfaces, vi) product transfer from the catalyst pores out of the particle, and vii) product transfer from the particle to the bulk mixture.

That is, important factors of heterogeneous catalyst reaction using supported catalysts are surface reaction rate, heat transfer and mass transfer. In particular, in heterogeneous catalyst reactions used for highly endothermic and exothermic reactions, heat and mass transfer are very important factors that greatly affect the function of the catalyst. Currently, energy loss and catalyst deactivation due to high endothermic and exothermic reactions in the process of catalytic reactions (steam reforming reaction of hydrocarbon and oxygenated hydrocarbon, F-T synthesis, etc.) are becoming problems, and the heat and mass transfer properties of catalysts are becoming increasingly important with downsizing of catalytic reactors and with the increase in the number of reactors requiring fast dynamic characteristics, according to the recent development of fuel cells and microreactors.

However, most of the existing catalytic materials in the field of chemical reaction and reaction engineering are based on ceramics having low thermal conductivity, and thus have great limitations in terms of heat and mass transfer. Accordingly, in order to improve the low heat and mass transfer rate of the supported catalysts, a conventional catalyst module and wash coat prepared by attaching a porous ceramic support layer and an active catalyst component on the surface of a metal structure such as a metal plate or metal mesh have been used. These catalyst composites have the advantages of having fast temperature response-characteristics due to high thermal conductivity compared to conventional catalyst carriers, high surface area per unit volume, easy fabrication, and high mechanical strength.

However, in the case of coating a porous ceramic carrier layer on a metal structure, the adhesion strength of the porous carrier layer is structurally weak, and a large amount of binder must be used as needed, and as a result, the mechanical and thermochemical properties and lifespan of the catalyst are weak and there is a problem that catalytic activity is deteriorated.

The above information disclosed in this Background section is only for enhancement of understanding of the background of the invention, and therefore it may contain information that does not form the prior art that is already known in this country to a person of ordinary skill in the art.

SUMMARY OF THE INVENTION

An object of the present invention is to provide a catalyst structure capable of controlling the surface morphology by changing the type of ion comprising a heteroatom added during the manufacturing process of the catalyst structure and a preparation method thereof.

According to an exemplary embodiment of the present invention, a catalyst structure having a core-shell structure with a controlled surface morphology, comprises a core comprising a metal and a shell formed on the core, wherein the shell comprises a metal hydroxide particle or a metal oxide particle formed uniformly in shape and size perpendicular to the surface of the metal, wherein the metal hydroxide or the metal oxide particle may have a 2D structure or a 1D structure.

The 2D structure may have the average value of the width/thickness ratio of the metal particles of 10.0 or more, and the average value of the length/width ratio of 3.0 or less.

The 1D structure may have an average value of the width/thickness ratio of the particles of 10.0 or less, and an average value of the length/width ratio of 3.0 or more.

The metal may be any one selected from the group consisting of Al, Cu, Cr, Co, Zn and Ni.

According to an exemplary embodiment of the present invention, a method for manufacturing catalyst structure having a core-shell structure with a controlled surface morphology, comprising: preparing a solution comprising an ion comprising a heteroatom; adding a metal particle for the core to the solution comprising an ion comprising the heteroatom and mixing; performing a hydrothermal reaction of the mixed solution to prepare a metal-metal hydroxide core-shell structure in which a metal hydroxide shell portion is formed on the surface of the metal particle for the core; drying the metal-metal hydroxide core-shell structure; and firing the dried metal-metal hydroxide core-shell structure to prepare a metal-metal hydroxide core-shell structure; wherein the growth form of the metal hydroxide and metal oxide particles may be controlled by changing the type of ion of the solution comprising an ion comprising the heteroatom.

The ion comprising the heteroatom may be a monovalent cation or a monovalent anion. At this time, the shape of the metal hydroxide and metal oxide particles may be a 2D structure.

The ion comprising the heteroatom may be a divalent cation or a divalent anion. At this time, the shape of the metal hydroxide and metal oxide particles may be a 1D structure.

The solution comprising an ion comprising the heteroatom may be in which any one selected from the group consisting of $NH_4Cl$, $NH_4NO_3$, $(NH_4)_2SO_4$ and $MgCl_2$ dissolved in deionized water.

According to an exemplary embodiment of the present invention, a method for manufacturing catalyst structure having a core-shell structure with a controlled surface morphology is simpler than the conventional manufacturing method of the metal ceramic composite, and the morphology of the catalyst structure may be controlled into a desired three-dimensional structure by changing the type of ion comprising a heteroatom added during the manufacturing process.

In addition, according to an exemplary embodiment of the present invention, the catalyst structure having a core-shell structure with a controlled surface morphology may improve its function as a catalyst according to the controlled surface morphology.

BRIEF DESCRIPTION OF THE DRAWINGS

FIG. 1 schematically illustrates a method of manufacturing a catalyst structure having a core-shell structure according to an exemplary embodiment of the present invention.

FIG. 2 shows a picture in which the width, length and thickness of the metal oxide or the metal oxide particles are displayed.

FIG. 3 shows the XRD analysis results of structures formed through hydrothermal reaction and structures formed through a firing process in Comparative Example, Example 1 and Example 4 of the present invention.

FIG. 4 shows SEM images of the Al@AlOOH core-shell structure manufactured in Example 1 and Example 4 of the present invention.

FIG. 5 shows $N_2$ adsorption and desorption isotherm and pore size distribution graph measured for the Al@$Al_2O_3$ core-shell structure manufactured in Comparative Examples, Example 1 and Example 4 of the present invention.

FIG. 6 shows the XRD analysis result of structure formed through hydrothermal reaction in Comparative Example, Example 2 and Example 3 of the present invention.

FIG. 7 shows SEM image of the Al@AlOOH core-shell structure manufactured in Comparative Examples, Example 2 and Example 3 of the present invention.

FIG. 8 is an $NH_3$-TPD analysis graph of the Al@$Al_2O_3$ core-shell structure manufactured in Comparative Example, Example 1 and Example 3 of the present invention.

FIG. 9 shows SEM images of the Al@$Al_2O_3$ core-shell structure of Comparative Example and Example 1 to Example 4 of the present invention.

DETAILED DESCRIPTION OF THE EMBODIMENTS

Terms such as first, second and third are used to describe, but are not limited to, various parts, component, region, layer and/or sections. These terms are only used to distinguish one part, component, region, layer or section from another part, component, region, layer or section. Accordingly, the first part, component, region, layer or section described below may be referred to as the second part, component, region, layer or section without departing from the scope of the present invention.

The terminology used herein is only for referring to specific embodiments and is not intended to limit the present invention. As used herein, the singular forms also include the plural forms unless the phrases clearly indicate the opposite. The meaning of "comprising" as used in the specification specifies particular characteristic, regions, integer, step, operation, element and/or component, and does not exclude the presence or addition of other characteristic, region, integer, step, operation, element and/or component.

When a part is referred to as being "top of" or "on" another part, it may be directly on or on the other part or may be followed by another part therebetween. In contrast, when a part is referred to be "directly on" another part, there is no intervening part between them.

Although not defined differently, all terms including technical term and scientific term used herein have the same meaning as commonly understood by a person of an ordinary skill in the art to which the present invention belongs. Terms defined in commonly used dictionaries are additionally interpreted as having meanings consistent with related technical literature and currently disclosed content, and are not interpreted in ideal or very formal meanings unless defined.

In this specification, "hetero atom" is defined as meaning an atom other than aluminum (Al) and oxygen (O).

Hereinafter, exemplary embodiment of the present invention will be described in detail to be easily practiced by a person of an ordinary skill in the art to which the present invention belongs. As those skilled in the art would realize, the described embodiments may be modified in various different ways, all without departing from the spirit or scope of the present invention.

According to an exemplary embodiment of the present invention, a catalyst structure having a core-shell structure with a controlled surface morphology, comprises a core comprising a metal and a shell formed on the core, wherein the shell comprises a metal hydroxide particle or a metal oxide particle formed uniformly in shape and size perpendicular to the surface of the metal, wherein the metal hydroxide or the metal oxide particle may have a 2D structure or a 1D structure.

The morphology of the core part in the catalyst structure of the core-shell structure according to the present invention is not particularly limited, and it is possible to have a particle shape, a metal plate, a metal rod, a metal pipe, a felt, a mat, a mesh, a foam, a foil, or a monolith, and the catalyst structure of the core-shell structure according to the present invention comprises all structures comprising metal oxide or metal oxide surrounding the core portion of the various shapes.

FIG. 2 shows a picture showing the width, length and thickness of the metal oxide or the metal oxide particle, and 1 D, 2D and 3D may be defined using the ratio of these lengths.

The 3D structure may have an average value of the particle of a width/thickness ratio of 10.0 or less and an average value of a length/width ratio of 3.0 or less. Specifically, the 3D structure may have an average value of the particle of a width/thickness ratio of 5.0 or less and an average value of a length/width ratio of 2.5 or less. The 3D structure having the ratio of the lengths takes the shape of a cuboid.

The 2D structure may have an average value of the particle of a width/thickness ratio of 10.0 or more and an average value of a length/width ratio of 3.0 or less. Specifically, the 2D structure may have an average value of the particle of a width/thickness ratio of 12.0 or more and an average value of a length/width ratio of 2.5 or less. More specifically, the 2D structure may have an average value of the particle of a width/thickness ratio of 15.0 or more and an average value of a length/width ratio of 2.0 or less.

The 1D structure may have an average value of the particle of a width/thickness ratio of 10.0 or less and an average value of a length/width ratio of 3.0 or more. Specifically, the 1D structure may have an average value of the particle of a width/thickness ratio of 5.0 or less and an average value of a length/width ratio of 4.0 or more.

In the case of the 2D structure and the 1D structure, heat and mass transfer effects may be enhanced through spaces between particles of the metal hydroxide and metal oxide due to the structure vertically and uniformly grown on the metal surface. When this is applied as a catalyst carrier, a smooth supply of reactants to the catalyst active material may occur, leading to high and constant catalytic reaction activity. Specifically, the 2D structure may have a petal shape (thin platelet shape), and the 1D structure may have a column shape or needle shape.

Since the metal comprised in the core preferably has high thermal conductivity and low heat capacity, By configuring the core with a material having high thermal conductivity and low heat capacity, the thermal conductivity of the entire catalyst structure may be improved and the heat capacity may be reduced. The metal may have a thermal conductivity of 50 W/(m·K) or more and a thermal weight of 30 J/(mol·K) or less. Specifically, the metal may be any one selected from the group consisting of Al, Cu, Cr, Co, Zn, and Ni. A Metal has the advantage that their thermal conductivity is much higher than that of metal compounds of each metal and their thermal weight is very small. Specifically, the metal may be Al.

Since the metal hydroxide and metal oxide comprised in the shell are formed using the metal comprised in the core as the only metal material, the type of the metal hydroxide and metal oxide also varies according to the type of metal comprised in the core. For example, when Al metal is used as a core, the metal hydroxide may be AlOOH and the metal oxide may be $Al_2O_3$.

As will be explained below, a topotactic transformation of a metal hydroxide into a metal oxide occurs, and in this process, the shape of a crystal changes, but the shape of the metal hydroxide and metal oxide particle remains the same, and the core-shell structure also remains the same.

A catalyst structure having a core-shell structure having a controlled surface morphology according to an embodiment of the present invention may have an acid point of 5.0 or more. In this specification, the acid point is defined the total amount of acid points divided by the specific surface area to eliminate the effect of the specific surface area of the material. When a catalyst structure with a high acid point is introduced into a catalyst support, it has a strong metal-support interaction (SMSI) between the metal active material (catalyst material) and the catalyst support. In this case, the particle size of the metal active material is reduced and there are many catalytic reaction active sites participating in the reaction, which means that the catalytic activity reaction may occur actively. In addition, the heterogeneous catalyst may cause a sintering phenomenon in which metal active materials tend to agglomerate at high temperatures, and when the particle size of the metal increases due to the sintering phenomenon, the number of reactive active sites decreases, resulting in a decrease in overall reaction activity. At this time, if the metal-support interaction force is large, the sintering phenomenon may be prevented, and high reaction activity may be maintained even at a high temperature. Therefore, if the acid point is too low, a problem that the reaction activity of the catalyst is reduced may occur due to the decrease in the metal-support interaction force for the above reasons. Specifically, the acid point may be 5.5 or more, and more specifically, 7 or more.

FIG. 1 schematically shows a method of manufacturing a catalyst structure having a core-shell structure according to an exemplary embodiment of the present invention. With reference to this, the contents of the invention will be described in detail below.

According to an exemplary embodiment of the present invention, a method for manufacturing catalyst structure having a core-shell structure with a controlled surface morphology, comprises preparing a solution comprising an ion comprising a heteroatom; performing a hydrothermal reaction of the mixed solution to prepare a metal-metal hydroxide core-shell structure in which a metal hydroxide shell portion is formed on the surface of the metal particle for the core; drying the metal-metal hydroxide core-shell structure; and firing the dried metal-metal hydroxide core-shell structure to prepare a metal-metal hydroxide core-shell structure; and wherein the growth form of the metal hydroxide and metal oxide particles is controlled by changing the type of ion of the solution comprising an ion comprising the heteroatom.

Since the metal particle for the core, the metal hydroxide, and the metal oxide have been described in detail in the description of the catalyst structure having a core-shell structure, they are omitted to avoid redundancy.

A solution comprising ions comprising heteroatoms may be prepared by dissolving a substance comprising ions comprising heteroatoms in deionized water.

By carrying out the hydrothermal reaction of the mixed solution, the manufacturing of the metal-metal hydroxide core-shell structure in which the metal hydroxide shell portion is formed on the surface of the metal particle for core may be performed at 300K to 600K for 1 hour to 7 hours. Specifically, it may be performed at 350K to 550K for 2 to 6 hours.

Drying the metal-metal hydroxide core-shell structure may be performed at 350 to 450K.

The step of manufacturing the metal-metal oxide core-shell structure by sintering the dried metal-metal hydroxide core-shell structure may be performed at 550K to 900K for 2 to 6 hours. Specifically, it may be performed at 600K to 900K for 3 hours to 5 hours. Metal hydroxides are calcined to transform topotactically into metal oxides. In this process, the shape of the crystal changes, but the entire surface and core-shell shape of the structure and the shape of the metal hydroxide particles may remain the same. In addition, the modified metal oxide has high thermal stability and specific surface area values.

According to an exemplary embodiment of the present invention, a method for manufacturing catalyst structure having a core-shell structure may control the growth morphology of the metal hydroxide and metal oxide particles by changing the type of ion of the solution comprising an ion comprising the heteroatom.

The principle of controlling the growth morphology of the metal hydroxide and the metal oxide in one exemplary embodiment of the present invention is as follows. In one exemplary embodiment of the present invention, the metal hydroxide is an amphoteric material. Therefore, the type of ions that may be adsorbed on the surface varies depending on the conditions of the reaction solution. Ion may be adsorbed to hydroxyl groups (OH) on two crystal planes of the surface of the metal hydroxide by electrostatic attraction. In addition, the adsorption tendency is divided even between the two crystal planes depending on the density of hydroxyl groups on the crystal plane surface. In the direction of the crystal plane where the ion is adsorbed, the shape of the particle may be controlled by using the principle that metal hydroxide crystal growth is hindered. As the intensity of adsorption of ions is strong, both crystal planes tend to be adsorbed, resulting in a 1D three-dimensional structure and if the intensity is weak, it tends to be selectively adsorbed on a crystal plane where adsorption is easy, resulting in a 2D three-dimensional structure. Ions with a larger charge have a greater influence on determining the shape of the metal hydroxide particle than ions with a relatively small charge, and when the magnitudes of charges are the same, the smaller the ionic radius, the stronger adsorption on the surface of the metal hydroxide has a great influence on determining the shape of the metal hydroxide particle.

An ion comprising a heteroatom may be a monovalent cation or a monovalent anion. Specifically, the ion comprising a heteroatom may be $NH_4^+$ or $NO_3^-$. When the ion comprising the heteroatom is a monovalent cation or monovalent anion, the shape of the metal hydroxide particle and metal oxide particle to be formed may have a petal-shaped 2D structure. This is because a monovalent cation or monovalent anion are selectively adsorbed on metal hydroxide due to relatively weak charge strength, and thus grow into a 2D particle structure.

An ion comprising a heteroatom may be a divalent cation or a divalent anion. Specifically, the ion comprising the heteroatom may be $Mg^2$+ or $SO_4^{2-}$. When an ion comprising a heteroatom is a divalent cation or a divalent anion, the formed metal hydroxide particle and metal oxide particle may have a columnar or needle-like 1D structure. This is because divalent cation or divalent anion are adsorbed on both crystal planes of metal hydroxide that may be adsorbed due to their relatively strong charge, and thus grow into a 1D particle structure.

The solution comprising an ion comprising heteroatom may be a solution by dissolving any one selected from the group consisting of $NH_4Cl$, $NH_4NO_3$, $(NH_4)_2SO_4$ and $MgCl_2$ in deionized water.

The concentration of the solution comprising an ion comprising heteroatom may be 0.3M or more. If the concentration of the solution comprising an ion comprising heteroatom is too low, it may be difficult to constantly control the growth patterns of the metal hydroxide particle and metal oxide particle since an ion adsorbed on the surface of the metal hydroxide is not generated sufficiently. Specifically, the concentration of the solution comprising an ion comprising heteroatom may be 0.3M to 5.0M, and more specifically, 0.5M to 5.0M.

The initial pH of the solution comprising an ion comprising heteroatom may be in the range of 6.0 to 8.0.

Hereinafter, exemplary embodiment of the present invention will be described in detail so that those skilled in the art can easily implement the present invention. However, the present invention may be embodied in many different forms and is not limited to the exemplary embodiment described herein.

EXAMPLE

1. Material

The pristine aluminum powder (ϕ≤25 μm, 99.9%) used in the synthesis was obtained from Goodfellow Co. (Huntingdon, UK) and used without further processing. Ammonium chloride ($NH_4Cl$, 98.5%, Duksan Chemical, Ansan, Korea), ammonium nitrate ($NH_4NO_3$, 99%, Junsei Chemical Co., Tokyo, Japan) and ammonium sulfate ($(NH_4)_2SO_4$, 99%, Kanto chemical, Tokyo, Japan) was used for the preparation of aqueous solutions of heteroatomic anions.

2. Shape-Controlled Synthesis of $Al@Al_2O_3$ Core-Shell Structures

(1) Comparative Example

Pure aluminum powder (Goodfellow, 2.5 g) and deionized (DI) water (60 mL) were charged into a Teflon-lined autoclave. Boehmite particle were grown on the Al metal surface by performing a hydrothermal reaction (HTR) at 423 K for 5 hours under autogenous pressure. Next, the autoclave was cooled to room temperature. The resulting sample was washed with a large amount of water, dried at 393K overnight, and then calcined in a muffle furnace at 873K for 4 hours (heating rate=$10K \cdot min^{-1}$) to manufacture an $Al@Al_2O_3$ core-shell structure.

(2) Example 1

A 1.0M $NH_4Cl$ solution was prepared by dissolving $NH_4Cl$ (3.21 g) in deionized water in a volume of 60 mL and filled into a Teflon-lined autoclave. The initial pH of the solution ranged from 6.2 to 6.4 and no further pH adjustment was performed. After adding pure Al powder (2.5 g) to the solution, a hydrothermal reaction (HTR) was performed at 423K for 5 hours under autogenous pressure to grow Boehmite particles on the Al metal surface. Next, the autoclave was cooled to room temperature. The resulting sample was washed with a large amount of water, dried at 393K overnight, and then calcined in a muffle furnace at 873K for 4 hours (heating rate=$10K \cdot min^{-1}$) to manufacture an $Al@Al_2O_3$ core-shell structure.

(3) Example 2

An $Al@Al_2O_3$ core-shell structure was manufactured in the same manner as in Example 1, except that a 1.0M $NH_4NO_3$ solution in which $NH_4NO_3$ (4.80 g) was dissolved in 60 mL of deionized water was used. The initial pH of the solution ranged from 6.2 to 6.4 and no further pH adjustment was performed.

(4) Example 3

An $Al@Al_2O_3$ core-shell structure was manufactured in the same manner as in Example 1, except that a 1.0M $(NH_4)_2SO_4$ solution in which $(NH_4)_2SO_4$ (7.93 g) was dissolved in 60 mL of deionized water was used. The initial pH of the solution ranged from 6.2 to 6.4 and no further pH adjustment was performed.

(5) Example 4

An Al@$Al_2O_3$ core-shell structure was manufactured in the same manner as in Example 1, except that a 1.0M $MgCl_2$ solution in which $MgCl_2$ (12.20 g) was dissolved in 60 mL of deionized water was used. The initial pH of the solution ranged from 6.2 to 6.4 and no further pH adjustment was performed.

EXPERIMENTAL EXAMPLE (1) Characteristics and Measurement Method

The characteristics measured in this experiment and the measurement method are described in detail.

SEM image: The surface morphology of the sample was photographed using a field emission scanning electron microscope (FE-SEM, SU8010, HITACHI) at an accelerating voltage of 2 kV.

XRD analysis: X-ray diffraction (XRD) patterns of the samples were obtained using a spectrometer (SmartLab, Rigaku) with monochromatic Cu—Kα radiation operated at 3 kW (scan rate=0.05° $min^{-1}$).

$N_2$ adsorption and desorption isotherms: The $N_2$ adsorption and desorption isotherms of the sample were measured using a volume unit (Tristar II, Micromeritics) after degassing in a vacuum state of 523K for 4 hours.

Specific surface area: The specific surface area of the sample was measured from $N_2$ adsorption and desorption isotherms by the Brunauer-Emmett-Teller (BET) method.

Pore size distribution: The pore size distribution of the samples was measured from the $N_2$ adsorption and desorption isotherms by the Barrett-Joyner-Halenda (BJH) method.

Total pore volume: The total pore volume of the sample was measured by single-point adsorption at saturation pressure.

$NH_3$-TPD analysis: The acidity of the sample was measured by flowing basic $NH_3$ gas and analyzing the amount of $NH_3$ adsorbed on the sample surface.

(2) Effects of Heteroatom Cation on the Growth Morphology of Boehmite and Alumina Particles In order to investigate the effect of cations in a solution comprising hetero atom on the growth morphology and structure of boehmite and alumina particles and the resulting structure characteristics, various experiments were performed on Comparative Example and Example 1 and Example 4 in which the common anion was $Cl^-$ and the cation was $NH_4$+ and $Mg^{2+}$, respectively.

In Comparative Example, Example 1 and Example 4, XRD analysis result of structure formed by hydrothermal reaction and the structure formed through the firing process are respectively shown in FIG. 3. Referring FIG. 3, In the results of XRD analysis of the structures of Comparative Example, Example 1 and Example 4, all of which were formed by hydrothermal reaction, since the characteristic diffraction peaks of Al metal (2θ=38.5, 44.7, 65.1, 78.2, 82.5°, ICDD #01-071-3760) and characteristic diffraction peaks (2θ=14.5, 28.1, 48.9°, ICDD #01-074-2895) of boehmite crystals, that is, γ-AlOOH crystals appear, it was confirmed that an Al@AlOOH core-shell structure in which boehmite crystals were formed on the Al surface was created due to the hydrothermal reaction. In addition, in the result of XRD analysis of the structure formed after the firing process, the characteristic diffraction peak of γ-AlOOH crystal disappeared and a diffraction peak corresponding to γ-$Al_2O_3$ appeared. From these results, it may be confirmed that topotactic transformation of γ-AlOOH into γ-$Al_2O_3$ occurred by the firing process.

SEM images of the Al@AlOOH core-shell structure manufactured in Comparative Example, Example 1 and Example 4 are respectively shown in FIG. 4. In addition, the length and ratio values of each part of the Boehmite particle of each sample measured through SEM image are shown in Table 1 below.

TABLE 1

| | Crystal stereoscopic structure | Width, W (nm) | Thickness, T (nm) | Length, L (nm) | W/T ratio | L/W ratio |
|---|---|---|---|---|---|---|
| Comparative Example | 3D structure | 180-600 nm (average 330 nm) | 30-330 nm (average 130 nm) | 30-330 nm (average 130 nm) | 1.3-8.5 (average 3.5) | 0.8-1.2 (average 1.0) |
| Example 1 | 2D structure | 140-280 nm (average 210 nm) | 10-20 nm (average 13 nm) | 10-20 nm (average 13 nm) | 11.5-28.5 (average 17.3) | 1.0-2.7 (average 1.8) |
| Example 4 | 1D structure | 120-180 nm (average 150 nm) | 40-80 nm (average 60 nm) | 730-1100 nm (average 860 nm) | 1.6-4.0 (average 2.5) | 4.9-7.3 (average 5.7) |

As shown in FIG. 4 and Table 1, the shape of the Boehmite particle obtained in Comparative Example is a three-dimensional structure similar to a rectangular parallelepiped, in which the average values of the width/thickness ratio of 3.5 and average value of the length/width ratio of 1.0, respectively, and the shape and size of the surface of the particle were very heterogeneous. In addition, it was confirmed that the boehmite particle was very densely packed. In contrast, the shape of the Boehmite particle obtained in Example 1 is a thin platelet shape with two-dimensional stereoscopic structure with very thin thickness and long width, in which the average values of the width/thickness ratio and average value of the length/width ratio of 17.3 and 2.5, respectively. The petal-shaped individual boehmite particle developed perpendicularly to the surface of the Al core to show a flower-like shape as a whole, and the surface morphology and size of the particle were uniformly formed compared to the comparative example. the shape of the Boehmite particle obtained in Example 4 is pillar or needle shape with a one-dimensional stereoscopic structure in which the length is very long compared to the width and thickness, in which the average values of the width/thickness ratio and average value of the length/width ratio of 2.5 and 5.7, respectively, and the shape and size of the surface of the particle were very non-uniform. The spatial orientation of the individual rod-shaped Boehmite particle was formed very uniformly, showing a sea urchin-like shape as a whole, and the surface morphology and size of the particle was uniformly formed compared to the Comparative Example.

FIG. 5 shows $N_2$ adsorption and desorption isotherms and pore size distribution graphs measured for the Al@$Al_2O_3$ core-shell structure manufactured in Comparative Example, Example 1 and Example 4. In addition, the specific surface area, average pore size and total pore volume were measured and summarized in Table 2 below.

TABLE 2

| | specific surface area (BET surface area) ($m^2 \cdot g^{-1}$) | average pore size (nm) | Total pore volume ($cm^3 \cdot g^{-1}$) |
|---|---|---|---|
| Comparative Example | 93 | 4.0 | 0.11 |
| Example 1 | 68 | 4.5 | 0.09 |
| Example 4 | 100 | 4.7 | 0.13 |

Referring to FIG. 5, it may be confirmed that all of the Al@$Al_2O_3$ core-shell structure manufactured in Comparative Example, Example 1, and Example 4 exhibit type IV isotherms, which are characteristics of mesoporous materials. Sharp H3-type hysteresis may be seen in the $P/P_0$ range of 0.4 to 0.95, which shows the existence of parallel slit-like pores due to the development of crystalline γ-$Al_2O_3$ shell in the Al@$Al_2O_3$ core-shell structure. In addition, the presence of a sharp BJH pore size distribution peak centered at ~4 nm confirms the uniform pore size of the γ-$Al_2O_3$ nanocrystals due to their high crystallinity.

In addition, referring to Table 2, it may be confirmed that the specific surface area of each structure by BET calculation has a value in the range of 60 to 100 $m^2/g$, and the total pore volume has a value of 0.09 to 0.13 $cm^3/g$. It may be confirmed that excellent surface properties are exhibited even when an Al core without voids is comprised.

(3) Effect of Heteroatom Anion on Growth Morphology of Boehmite and Alumina Particle In order to investigate the effect of anion in solution comprising hetero atoms on the growth morphology and structure of Boehmite and alumina particle and the resulting structure characteristics, various experiments were performed on Comparative Example and Example 2 and Example 3 in which the cation was common as $NH_4^+$ and the anion was $NO_3^-$ and $SO_4^{2-}$, respectively.

The results of XRD analysis of structure formed by hydrothermal reaction in Comparative Example, Example 2 and Example 3 are respectively shown in FIG. 6. Referring FIG. 6, from the results of XRD analysis of structure formed by hydrothermal reaction in Comparative Example, Example 2 and Example 3, characteristic diffraction peaks of Al and Boehmite crystal, that is, γ-AlOOH crystal, appeared, confirming that an Al@AlOOH core-shell structure in which Boehmite crystals were formed on the Al surface was created due to hydrothermal reaction.

SEM image of the Al@AlOOH core-shell structure manufactured in Comparative Example, Example 2 and Example 3 are respectively shown in FIG. 7. In addition, the length and ratio values of each part of the Boehmite particle of each sample measured through SEM image are shown in Table 3 below.

TABLE 3

| | Crystal stereoscopic structure | Width, W (nm) | Thickness, T (nm) | Length, L (nm) | W/T ratio | L/W ratio |
|---|---|---|---|---|---|---|
| Comparative Example | 3D structure | 180-600 nm (average 330 nm) | 30-330 nm (average 130 nm) | 30-330 nm (average 130 nm) | 1.3-8.5 (average 3.5) | 0.8-1.2 (average 1.0) |
| Example 2 | 2D structure | 180-300 nm (average 200 nm) | 10-30 nm (average 18 nm) | 10-20 nm (average 13 nm) | 11.5-28.5 (average 17.3) | 1.0-2.7 (average 1.8) |
| Example 3 | 1D structure | 70-130 nm (average 110 nm) | 15-30 nm (average 22 nm) | 400-530 nm (average 470 nm) | 3.3-8.7 (average 5.0) | 3.6-4.8 (average 4.3) |

Referring to FIG. 7 and Table 3, Boehmite particle obtained in Example 2 is a petal (thin platelet) shape with two-dimensional stereoscopic structure with very thin thickness and long width, in which the average values of the width/thickness ratio and average value of the length/width ratio of 17.3 and 1.8, respectively.

The petal-shaped individual Boehmite particle developed perpendicularly to the surface of the Al core to show a flower-like shape as a whole, and the surface shape and size of the crystal were uniformly formed compared to the comparative example. In addition, the shape of the Boehmite particle obtained in Example 3 is a rod shape with a one-dimensional stereoscopic structure in which the length is very long compared to the width and thickness, in which the average values of the width/thickness ratio and average value of the length/width ratio of 5.0 and 4.3, respectively. The spatial orientation of the individual rod-shaped Boehmite particle was formed very uniformly, showing a sea urchin-like shape as a whole, and the surface morphology and size of the particle was uniformly formed compared to the Comparative Example. Information on the shape of the Boehmite particle obtained in Comparative Example overlapped with the information described in Experimental Example (2) and was omitted.

(4) Change in Acidity According to the Stereoscopic Structure of Boehmite and Alumina Particle To investigate the change of acid point according to the stereoscopic structure of Boehmite and alumina particle, $NH_3$-TPD analysis graphs of the Al@$Al_2O_3$ core-shell structure manufactured in Comparative Example, Example 1 and Example 3 are shown in FIG. 8, and the acid points of each example are measured and summarized in Table 4 below.

The three-dimensional structure of each particle is defined by the above-mentioned width/thickness ratio and length/width ratio of the particle, and since the shape of the core-shell catalyst structure having the same particle conformation will be similar, the core-shell catalyst structures with the same particle conformation are expected to exhibit similar acid sites.

TABLE 4

| | Crystal stereoscopic structure | Quantity of acid site ($\mu$molg$^{-1}$) | specific surface area ($SA_{BET-}$) ($m^2$ $g^{-1}$) | Quantity of acid site per $SA_{BET}$ ($\mu$mol $m^2$) |
|---|---|---|---|---|
| Comparative Example | 3D structure | 424 | 93 | 4.6 |
| Example 1 | 2D structure | 276 | 51 | 5.4 |
| Example 4 | 1D structure | 1072 | 138 | 7.8 |

Referring to FIG. 8 and Table 4, the quantity of acid site is in the order of 1D>3D>2D, but acid sites generally vary depending on the specific surface area of a material. Divided by the specific surface area, the quantity of acid sites per specific surface area in each three-dimensional structure was calculated. As a result, due to the difference in crystal structure, there are more acid sites (Quantity of acid sites per $SA_{BET}$) of examples having a 2D or 1 D structure compared to a 3D structure, it was confirmed that when the examples are introduced into the catalyst support, they may have better catalytic properties than the comparative example. This is because $Al_2O_3$ having 2D and 1D shapes may expose more acid sites on the surface crystallographically.

(5) Comparison of Surface Morphology of Al@AlOOH Core-Shell Structures and Al@$Al_2O_3$ Core-Shell Structures In order to compare the surface morphology of the Al@AlOOH core-shell structure and the Al@$Al_2O_3$ core-shell structure prepared by firing it, SEM images of the Al@$Al_2O_3$ core-shell structure after firing in Comparative Example and Examples 1 to 4 are shown in FIG. 9.

When comparing SEM images of the Al@AlOOH structures of Comparative Examples and Examples 1 to 4 disclosed in FIGS. 4 and 7, and SEM images of the Al@$Al_2O_3$ structures of Comparative Example and Examples 1 to 4 disclosed in FIG. 9, it may be confirmed that the entire surface and core-shell shape of the structure before and after firing are maintained as they are, and the shape of $Al_2O_3$ is also maintained the same as the shape of the AlOOH particles before firing.

The present invention is not limited to the embodiments, but can be manufactured in a variety of different forms, and those skilled in the art to which the present invention pertains will understand that it may be implemented in other specific forms without changing the technical spirit or essential characteristics of the present invention. Therefore, the embodiments described above should be understood as illustrative in all respects and not limiting.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A catalyst structure having a core-shell structure with a controlled surface morphology, comprising:

a core comprising a metal; and a shell formed on the core, wherein the shell comprises metal hydroxide particles or metal oxide particles formed uniformly in shape and size perpendicular to the surface of the metal of the core, wherein the metal of the core is any one selected from the group consisting of Al, Cu, Cr, Co, Zn and Ni, wherein the metal hydroxide particles or the metal oxide particles have a 2D structure or a 1D structure, wherein the 2D structure has an average value of the width/thickness ratio of the particles of 10.0 or more, and an average value of the length/width ratio of 3.0 or less, and wherein the 1D structure has an average value of the width/thickness ratio of the particles of 10.0 or less, and an average value of the length/width ratio of 3.0 or more.

2. The catalyst structure of claim 1, wherein:

the 2D structure has an average value of the width/thickness ratio of the particles of 12.0 or more, and an average value of the length/width ratio of 2.5 or less.

3. The catalyst structure of claim 1, wherein:

the 1D structure has an average value of the width/thickness ratio of the particles of 5.0 or less, and an average value of the length/width ratio of 4.0 or more.

4. The catalyst structure of claim 1, wherein:

the metal of the core is Al.

* * * * *